United States Patent Office 2,809,966
Patented Oct. 15, 1957

2,809,966

P-AMINOBENZENE-SULPHONYL-2-AMINO-OXAZOLE DERIVATIVE

Werner Loop, Hamburg-Lokstedt, Erich Luhrs, Hamburg-Gr. Flottbek, and Peter Hauschildt, Hamburg, Germany, assignors to Nordmark-Werke Gesellschaft mit beschrankter Haftung, Hamburg, Germany No Drawing. Application June 25, 1956,
Serial No. 593,317

Claims priority, application Germany July 28, 1955

1 Claim. (Cl. 260—239.9)

This invention relates to a new p-aminobenzene-sulphonyl-2-amino-oxazole derivative. p-Aminobenzene-sulphonyl-2-amino-oxazole has already been described (cf. U. S. Patent 2,362,336, and also Anderson et al., J. Am. Chem. Soc. 64 (1942) pages 2902–05). The product has proved ineffective in a test carried out on mice with streptococcus and pneumococcus infections (cf. Anderson et al. loc. cit. particularly page 2903).

The new derivative of the invention is p-aminobenzene-sulphonyl-2-amino-4,5-dimethyl oxazole of the formula:

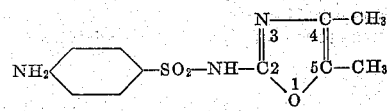

which has been found to have very good action with very low toxicity in the mouse test against Streptococci Aronson. The solubility of the new substance and its acetyl derivative in water at 37° C. in the physiological pH range, which is of such great importance as regards tolerance in the urinary passages, is very favourable. In the following table, the values for the new compound and its acetyl derivative are compared with the values of a number of important sulphapyrimidines, the values for the latter being taken from the "Antibiotika-Fibel" by Walter and Heilmeier, page 27, and the values for the corresponding acetyl compounds being shown in brackets.

TABLE 2-sulpha-4,5-dimethyl oxazole, pH 5:194 mg% (27.8 mg%)
2 - sulpha - 4,5 - dimethyl oxazole, pH 6:242 mg% (29.2 mg%)
6 - sulpha - 2,4 - dimethyl pyrimidine, pH 6:250 mg% (5 mg%)
2-sulpha-pyrimidine, pH 6:16 mg% (45 mg%)
2-sulpha-4-methyl pyrimidine, pH 5.5:49 mg% (80 mg%)

It will be seen from this table that the solubility of the acetyl compound of 2-sulpha-4,5-dimethyl oxazole is good and that of the free compound is excellent.

The novel substance is quickly resorbed, but is eliminated substantially more slowly than sulphadiazine and 6 - sulpha - 2,4 - dimethyl pyrimidine. This property, in which it is similar to sulphamerazine, opens up the possibility of a very satisfactory complementary combination with more rapidly eliminated sulphonamides and a smaller dosage. A smaller dosage in sulphonamide therapy is desirable, on account of the reduction of the danger of secondary effects, the greater acceptability to the patient and the greater economy.

p-Aminobenzene-sulphonyl-2-amino-4,5 - dimethyl oxazole can be prepared according to processes which are known per se. For example, a benzene-sulphonic acid, in which a substituent which can be converted into the amino group is carried in the p-position relative to the sulphonic acid group, or a reactive derivative of such an acid, preferably the sulphonic acid chloride, can be condensed with 2-amino-4,5-dimethyl oxazole and the substituent at the p-position can then be transformed into the amino group. The condensaton can take place in the presence or absence of condensation agents. Generally mixtures of mono- and bis-benzene-sulphonyl-2-amino-4,5-dimethyl oxazoles are obtained. Preferably, one mol of 2-amino-4,5-dimethyl oxazole is condensed in the presence of trimethylamine or a dimethyl alkylamine, the alkyl group of which contains 2 to 4 carbon atoms, or a mixture of trimethylamine and another tertiary organic base which is of stronger basic character than trimethyl amine, with two mols of a benzene-sulphonyl chloride, carrying a substituent convertible into an amino group in the p-position relative to the sulpho group. In this case, there is obtained a good yield of condensation product, which consists practically only of the bis-benzene-sulphonyl derivative of 2-amino-4,5-dimethyl oxazole.

Such bis-products can be transformed into mono-products in a manner known per se, for example by hydrolysis or by reaction with another mol of 2-amino-4,5-dimethyl oxazole. The conversion of the substituent in the p-position relative to the sulpho group into the amino group can also be effected by known processes, for example by hydrolysis, by reduction or, if the substituent is halogen, by treatment with aqueous or alcoholic ammonia at elevated temperature and under pressure. If the substituent in the p-position can be converted by hydrolysis into the amino group, the bis-product formed in the condensation, or a mixture of such bis-product and the mono-product can be converted in a single step into 2-sulpha-4,5-dimethyl oxazole.

Example 1

11.2 gm. of 2-amino-4,5-dimethyl oxazole (0.1 mol), 46.8 gm. of anhydrous p-acetamino-benzene-sulphonyl chloride (0.2 mol) and 60 cc. of methylene chloride are mixed and then treated while stirring and with exclusion of water with 12.0 gm. (0.2 mol) of anhydrous trimethylamine, dissolved in 60 cc. of benzene. After adding the trimethlylamine, the mixture is heated for 30 minutes to 40° C., left to stand for 12 hours and then the solvent is distilled off. The distillation residue is heated with 300 cc. of water until the residual organic solvents are driven off. The residue is filtered and thoroughly washed with water. Yield of condensation product: 46.4 gm. The mass is triturated with 80 cc. of cold 2.5% caustic soda solution, filtered and thoroughly washed with water. The residue which is insoluble in caustic soda solution consists of bis-(p-acetamino-benzene-sulphonyl) - 2 - amino-4,5-dimethyl oxazole. It melts indefinitely between 201–206° C. with decomposition (browning). Yield: 42.3 gm. corresponding to 83.6%.

The 42.3 gm. of the bis-compound are heated under reflux in 210 cc. of 96% ethanol containing 10% of hydrogen chloride, to the boiling point of the alcohol. After dissolution, the substance is boiled for 20 minutes under reflux. It is cooled, filtered and washed with alcohol. By concentrating the mother liquor and the washing liquid by evaporation, further amounts of substance are obtained.

The total amount of the hydrochloride obtained is stirred with 50 cc. of water and the mixture is mixed with 15 cc. of 45% caustic soda solution. After complete dissolution, the mixture is treated with decolorising carbon and the filtrate is brought to a pH value of 5.5 by means of hydrochloric acid. 17.6 gm. of p-aminobenzene-sulphonyl - 2 - amino - 4,5 - dimethyl oxazole are obtained as colourless crystals with a melting point of 193–194° C. (corrected), corresponding to a yield of 65.9% calculated on the basis of the 2-amino-4,5-dimethyl oxazole used.

For purification purposes, the substance can be dissolved and recrystallised from dilute alcohol or from water.

Example 2

11.2 gm. (0.1 mol) of 2-amino-4,5-dimethyl oxazole and 11.7 gm. (0.05 mol) of anhydrous p-acetaminobenzene-sulphonyl chloride are dissolved in 50 cc. of anhydrous acetone. The solution is boiled for 1 hour under reflux and thereafter distilled as far as possible. The residue from the distillation is stirred with 100 cc. of hot water. After cooling, it is filtered and thoroughly washed with water. Yield of condensation product: 10.3 gm.

The condensation product is subjected to hydrolysis as previously described in Example 1. p-Aminobenzene-sulphonyl-2-amino-4,5-dimethyl oxazole is obtained, which melts at 193–194° C. (corrected) after being dissolved and recrystallised from water.

Example 3

5.6 gm. (0.05 mol) of 2-amino-4,5-dimethyl oxazole and 11.7 gm. (0.05 mol) of anhydrous p-acetaminobenzene-sulphonyl chloride are dissolved in 50 cc. of anhydrous acetone. 8 gm. of anhydrous pyridine are added to the solution and the mixture is stirred for 3 hours at room temperature. The organic solvents are then distilled off. The distillation residue is thoroughly stirred with 100 cc. of hot water. Yield of condensation product: 7.7 gm. After separation with cold dilute caustic soda solution, there are obtained therefrom 4.5 gm. of bis-compound and 3.0 gm. of mono-compound.

The bis- and mono-compounds are jointly subjected to hydrolysis as described in Example 1. p-Aminobenzene-sulphonyl-2-amino-4,5-dimethyl oxazole is obtained, which melts at 193–194° C. (corrected) after dissolving and recrystallising from water.

Example 4

5.6 gm. (0.05 mol) of 2-amino-4,5-dimethyl oxazole and 22.2 gm. (0.01 mol) of anhydrous p-nitrobenzene sulphonyl chloride are dissolved in 50 cc. of methylene chloride. This mixture is mixed while stirring and with exclusion of air with 6 gm. (0.1 mol) of anhydrous trimethylamine, dissolved in 30 cc. of benzene. After adding the trimethylamine, stirring of the mixture is continued for 3 hours and then the organic solvents are distilled off. The distillation residue is thoroughly stirred with 100 cc. of hot water until the residues of the organic solvents are driven off. Bis-(p-nitrobenzene sulphonyl)-2-amino-4,5-dimethyl oxazole is obtained with a yield of 19.5 gm., corresponding to 80.9% of the theoretical; melting point 208–211° C. (corrected).

4.9 gm. of the bis-compound are suspended in 100 cc. of 50% ethanol. 5 gm. of iron powder and 5 cc. of 10% hydrochloric acid are added to the mixture, which is then boiled under reflux while stirring vigorously. After one hour, another 5 cc. of 10% hydrochloric acid are added to the mixture, while yet another 5 cc. of hydrochloric acid are added after another hour. After the last addition of hydrochloric acid, boiling is continued for another 2 hours under reflux while stirring constantly and thereafter the alcohol is evaporated. The distillation residue is made alkaline with 30 cc. of 10% caustic soda solution, filtered and the filter residue is washed with dilute caustic soda solution. The filtrate is brought to a pH value of 5.5 by means of acid. The p-aminobenzene-sulphonyl-2-amino-4,5-dimethyl oxazole crystallises as colourless crystals. After being dissolved and recrystallised from water, the substance melts at 193–194° C. (corrected).

What we claim is:

p-Aminobenzene - sulphonyl - 2 - amino - 4,5 - dimethyl oxazole.

References Cited in the file of this patent

UNITED STATES PATENTS

| | | |
|---|---|---|
| 2,362,087 | Newberry | Nov. 7, 1944 |
| 2,362,336 | Anderson | Nov. 7, 1944 |
| 2,430,094 | Wuest et al. | Nov. 4, 1947 |